United States Patent
Zhang (10) Patent No.: US 8,728,319 B2
(45) Date of Patent: *May 20, 2014

(54) PURIFYING DEVICE FOR DEEPLY TREATING PRINTING AND DYEING WASTEWATER, AND PURIFYING PROCESS THEREFOR

(75) Inventor: Shiwen Zhang, Xiamen (CN)

(73) Assignee: Boying Xiamen Science and Technology Co., Ltd., Xiamen, Fujian Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/512,327

(22) PCT Filed: Jan. 26, 2011

(86) PCT No.: PCT/CN2011/070668
§ 371 (c)(1),
(2), (4) Date: May 26, 2012

(87) PCT Pub. No.: WO2011/063769
PCT Pub. Date: Jun. 3, 2011

(65) Prior Publication Data
US 2012/0285887 A1 Nov. 15, 2012

(30) Foreign Application Priority Data
Nov. 27, 2009 (CN) .......................... 2009 1 0112879

(51) Int. Cl.
- B01D 57/00 (2006.01)
- B01D 61/58 (2006.01)
- C02F 1/44 (2006.01)
- C02F 1/66 (2006.01)
- C02F 9/06 (2006.01)

(52) U.S. Cl.
USPC ........... 210/636; 204/663; 204/665; 210/134; 210/192; 210/243; 210/257.2; 210/259; 210/263; 210/638; 210/639; 210/641; 210/650; 210/652; 210/669; 210/748.01; 210/748.13

(58) Field of Classification Search
USPC ........... 210/134, 136, 137, 192, 257.1, 257.2, 210/258, 259, 321.69, 636–639, 650, 652, 210/662, 663, 669, 641, 719, 721, 748.01, 210/748.13, 749, 806, 195.2, 805, 243, 210/263; 204/660, 663, 665
See application file for complete search history.

(56) References Cited

U.S. PATENT DOCUMENTS 4,773,979 A * 9/1988 Wahl .............................. 204/240
5,236,595 A * 8/1993 Wang et al. .................... 210/669
(Continued)

FOREIGN PATENT DOCUMENTS

| CN | 101456637 A | 6/2009 |
| CN | 101462804 A | 6/2009 |

(Continued)

OTHER PUBLICATIONS

Zhemin et al, "Degradation of dye solution by an activated carbon fiber electrode electrodialysis system", Journal of Hazardous Materials b84 (2001), pp. 107-116.*

(Continued)

*Primary Examiner* — Joseph Drodge (57) ABSTRACT

A purifying device and a process for deeply treating printing and dyeing wastewater are provided. The device includes a nanometer catalytic microelectrolysis system, a membrane filtration and separation system and a a membrane washing regeneration system. The method includes the following steps of: drawing the printing and dyeing wastewater by a first water pump (12), pumping a first part of the wastewater into a nanometer catalytic microelectrolysis tank (13) to perform catalysis microelectrolysis, and a second part of the wastewater into a neutralization tank (16) to mix with the water from the nanometer catalytic microelectrolysis tank (13) to precipitate, filtering the wastewater by a sand filtration tank (17), and then pumping the wastewater into an adsorption and filteration device of granular active carbon (18) for adsorption and filtration. The process has lower cost and higher energy efficiency, and can realize recycled water to be reused.

10 Claims, 1 Drawing Sheet

(56) References Cited

U.S. PATENT DOCUMENTS

| | | | |
|---|---|---|---|
| 5,605,633 A * | 2/1997 | Nakamura et al. | 210/732 |
| 6,322,701 B1 * | 11/2001 | Delighiannis | 210/620 |
| 6,428,705 B1 * | 8/2002 | Allen et al. | 210/638 |
| 7,294,270 B2 * | 11/2007 | Miyazaki et al. | 210/610 |
| 2007/0144898 A1 * | 6/2007 | Oldani et al. | 204/286.1 |

FOREIGN PATENT DOCUMENTS

| | | |
|---|---|---|
| CN | 101704594 A | 5/2010 |
| CN | 201560154 U | 8/2010 |
| FR | 2904236 A1 | 2/2008 |

OTHER PUBLICATIONS

Abstract of Journal Article: Yan Bin Fu Haiyan et al, "Application of Microelectrolysis Method in Dyehouse Wastewater Treatment", Journal of Xiamen University of Technology, Jan. 2008.*

Abstract of Journal Article: Liang Yaokai et al, "Experimental Study on Treatment of Printing and Dyeing Wastewater with Fe-C Micro Electrolysis Method", Journal of Guangdong Industry Technical College, Mar. 2003.*

* cited by examiner

PURIFYING DEVICE FOR DEEPLY TREATING PRINTING AND DYEING WASTEWATER, AND PURIFYING PROCESS THEREFOR

BACKGROUND OF THE PRESENT INVENTION

1. Field of Invention

The present invention relates to a process for purifying and recycling printing and dyeing wastewater, and more particularly to a purifying and recycling process for deeply treating printing and dyeing wastewater based on a combination of nanometer catalytic microelectrolysis technology and membrane technology.

2. Description of Related Arts

Textile industry generally includes spinning, printing and dyeing, chemical fiber, clothing and manufacture of textile devices. With the fast development of the economy, the printing and dyeing industry also enters a fast developing period, the devices and technology are improved obviously, the production process and devices are changed continuously, and the printing and dyeing companies develop very fast. So far, there are more than 2,000 printing and dyeing companies above designated size in China. The printing and dyeing processes refer to physical and chemical process to various textile material fibers, yarns, and cloths in production, and include pre-treating, dyeing, printing, and after-treating of textile materials which are together called printing and dyeing processes. At present, the development of the textile technology is guided with ecological fabrics production and green production technology, catches the source through multi-channels including processes, adjuvants, and devices, emphasizes the ecological problems of each link, optimizes the textile processes hard, and reduces the consumption of chemical agents, water and energy, so as to achieve the goal of high efficiency, high speed and environment-friendliness. A great effort is paid to environment-friendly dye stuff adjuvants, new processes saving water, energy and reducing emission and new devices at home and abroad, and an obvious progress is made in printing and dyeing technology with no water or less water, printing and dyeing of painting, and utility model of textile saving energy and water. However, despite the fast development of the technology of saving water and treating wastewater in the textile printing and dyeing industry, the textile printing and dyeing wastewater is still an important pollution source in China's industrial system. According to the statistics of Ministry of Environmental Protection of the People's Republic of China, the printing and dyeing wastewater drained by the printing and dyeing industry is the fifth largest in all the industrial departments of China. The character of the printing and dyeing wastewater as an important environment pollution source is firstly large amount. At present, the printing and dyeing products are about 800,000~900,000 tons in the world, and China has 150,000 tons, ranking in the top. About 10%~15% of the printing and dyeing components are drained into the environment along with wastewater in production and use of the printing and dyeing products. The printing and dyeing industry and textile printing and dyeing industry are high developed, and the printing and dyeing wastewater pollutes the environment more seriously. In 2004, the printing and dyeing industry drained 1.36 billions m³, and the pollutant is the sixth largest in all the industrial departments calculated by COD. Secondly, the type of printing and dyeing components as environmental pollutants have many species and complex structures. The synthesis printing and dyeing components have more than 30,000 species, and more than 80% of them contain complex organic compounds of azo bond and poly-aromatic. Printing and dyeing industry is one of the industries of extremely serious environmental pollution in the chemical industries. The printing and dyeing wastewater has large chromaticity, high concentration of organic matters, complex components, many hardly biodegradable substances, and contains a large number of inorganic salts, sulfides, etc., are intractable industrial wastewater. The printing and dyeing components are hard to be removed due to its complex aromatic hydrocarbons molecular structure, which are desired to exist stably in water environment or under illumination and oxidants when designing and production. Thirdly, most printing and dyeing components are toxic non-degradable organic matters having strong chemical stabilization, and carcinogenic, teratogenic and mutagenic effects. Even the concentration of the remained printing and dyeing components are low in the wastewater, it will also reduce the light transmittance of water body after draining into the water body, so as to cause damage to the water ecological system. Therefore, efficiently treating the printing and dyeing wastewater has become an important problem.

The printing and dyeing wastewater has characters such as high concentration and large number of species of pollutants, containing toxic and harmful components and high chromaticity. The ordinary treating methods to the printing and dyeing wastewater at home and abroad comprise physical methods, chemical methods, biological methods, and etc.

1. Physical Methods

The physical methods mainly comprise flotation method of adsorption, membrane separation method, ultrasonic gas vibration method, and distillation method. The adsorption method is applied mostly in the physical methods. At present, the activated carbon adsorption method is mainly adopted in international. The method is very effective for removal of dissolved organic matters, but can not remove colloids and hydrophobic dyeing, and has good adsorption properties to the water-soluble printing and dyeing components in cationic printing and dyeing, direct printing and dyeing, acid printing and dyeing, reactive printing and dyeing.

Adsorption flotation method first absorbs printing and dyeing ion and other soluble substances from the wastewater with highly dispersed powdery inorganic adsorbents such as bentonite and kaolin, then adds the flotation agent to obtain hydrophobic particles by airfloating, the removal efficiency of acid printing and dyeing, cationic printing and dyeing, and direct printing and dyeing can be more than 92%.

The membrane technology applied in treating printing and dyeing wastewater mainly comprises ultra-filtraten and reverse osmosis. The ultra-filtraten technology has a decolourization rate of 80%~97%, and a TOC removal rate of 60%~85% in treating scattered printing and dyeing wastewater. The reverse osmosis technology has a removal rate of soluble solid of 85%~-99%, and an average recycle rate of 75%~85%.

The ultrasonic technology can become an effective method of treating wastewater by controlling the ultrasonic frequency and saturation of gas. The Zhangjiagang Jiuzhou Fine Chemical Industry treats printing and dyeing wastewater with the FBZ wastewater treatment equipment designed according to ultrasonic gas vibration technology, and has an average chroma removal rate of 97%, a $COD_{Cr}$ removal rate of 90.6%, and a total pollution load reduction rate of 85.9%.

2. Chemical Methods

Chemical methods mainly comprise chemical coagulation method, chemical oxidation method, photochemical catalytic oxidation method, and electrochemical method. The chemical coagulation method is a frequently used method of treating printing and dyeing wastewater, and was thought to be one of the most efficient and economic decoloring technologies. The chemical oxidation method is a main method of decoloring printing and dyeing wastewater, decolors by destroying printing and dyeing color groups with various oxidation methods. Depending on the oxidants and oxidation condition, the chemical oxidation method is divided into ozone oxidation method and deep oxidation method. Furthermore, the photochemical catalytic oxidation method as a deep oxidation technology for reducing organic matters develops fast in recent years. Referring to ZHANG Gui-Ian, Photodegradation of dyes in water using rotation reactor [J]. JOURNAL OF TEXTILE RESEARCH, 2005, 26(3): 109-111, the photochemical catalytic oxidation method achieves good decoloring effect in degrading printing and dyeing wastewater. The electrochemical method purifies printing and dyeing wastewater by electrode reaction.

Microelectrolysis method is an electrochemical technology using iron and carbon filler corroded in the electrolyte solution to form numerous tiny primary cells to treat wastewater. It is a wastewater treating method combining electrolysis, coagulation, electrolytic flocculation, adsorption and other physical and chemical effects in one. In the treatment of printing and dyeing wastewater, printing and dyeing molecules are first adsorbed onto the carbon surface, and have oxidation or reduction reactions in the two poles. The electrode can also be used for electrolysis. Referring to Jia Jinping, Shen Zhemin, Wang Wenhua, The Status Quo and Progress on Treating Methods of Wastewater Containing Dyestaff, 2000, 191:26-29, the integrated performance of electrode conductivity, adsorption, catalytic, redox, the flotation of activated carbon fiber electrode is used to achieve a one-stop process of adsorption—electrode reaction—flocculation and desorption, and the decolorization rate is 98%, $COD_{Cr}$ removal rate is greater than 80%. Referring to YAN Bin, FU Hai-yan, CHAI Tian, JIN Lei, SHI Qian, Application of Microelectrolysis Method in Dyehouse Wastewater Treatment, JOURNAL OF XIAMEN UNIVERSITY OF TECHNOLOGY, 2008, 16(1):18-22, decoloring and $COD_{Cr}$ removal effects to wastewater produced by cotton series and chemical fiber synthetic woven fabrics with microelectrolysis technology of iron—carbon electrode is studied, when the mass ratio of iron to carbon is 2:1, HRT is 1.5 h, the COD removal rate is up to 55%, chromaticity removal rate is 95%, BOD/COD increased from 0.3 to 0.5. Referring to Luo Jingsheng, Zeng Kangmei, Zuo Jingying, Li Xin, Liu Fude, TREATMENT OF DYE WASTEWATER BY MICROELECTROLYSIS PROCESS, TECHNOLOGY OF WATER TREATMENT, 2005, 31(11):67-70, treating production wastewater containing dyestuff, dye intermediate, and adjuvant with circulating iron—carbon microelectrolysis method is studied. The result shows that pH of the raw water has great affect to treating effect. When pH is within 1~5, the lower pH is, the better the treating effect is, and when pH is 1, COD removal rate is about 60%, chromaticity removal rate is above 94%. Referring to Deng Xihong, Wang Chao, An Engineering Example of Treating Dyeing Wasterwater Using Microelectrolysis—Physical and Chemical—Biochemical Method, Environmental Science and Management, 2008, 33(3):120-122, the printing and dyeing wastewater of high pollutant concentration, large concentration fluctuations, alkaline, high chromaticity, and biorefractory property is treated with Microelectrolysis—Physical and Chemical—Biochemical Method, which runs continuously for three months, and the result shows that the method runs stably, has low investment and low treating cost, (0.765 RMB per ton), the removal rates of COD, BOD, SS and chromaticity are respectively above 94%, 96%, 89%, and 96%. The indexes of effluent quality all meet emission standards. EpolitoW illiam J,HanbaeYang, et al. studies microelectrolysis to RB4 (Reactive Blue4) wastewater. The experimental result shows that the decoloring rate gradually increases with the decreasing of pH, and increasing of stirring, experimental temperature and ionic strength. There are also many other reports about treating printing and dyeing wastewater with electrochemical method.

3. Biochemical Methods

The printing and dyeing wastewater is biorefractory, so if desiring treating with biochemical methods, MLSS of the activated sludge can be increased, and biochemical performance of the activated sludge can be improved, or efficient strains are used to increase biochemical effect. Breeding and training excellent decolorization flora is an important development direction of the biochemical methods. The research of formation of engineering bacteria with multiple plasmids efficiently decoloring printing and dyeing wastewater by use of mutation breeding, protoplast fusion, and genetic engineering techniques. The recent studies show that the dominant bacteria of the *Pseudomonas* bacteria, *Sphaerotilus natans, Arthrobacter, Bacillus subtilis*, and oxidative yeast have a considerable effect of in degradation of printing and dyeing wastewater.

In recent years, the combination of chemical and physical methods for treating printing and dyeing wastewater, or the combination of biological treatment and physical treatment for printing and dyeing wastewater has developed rapidly. Chinese patent of ZL 200710008643.0 discloses a treating method for printing and dyeing wastewater based on membrane technology, which combines chemical coagulation and sedimentation, biological treatment, and reverse osmosis separation technology for treating combines printing and dyeing wastewater.

Although the above methods all have good treating effect, the following problems still exist.

In the physical and chemical aspect, activated carbon has good adsorption effect, but activated carbon is difficult to regenerate, has high cost, and thus its application is limited. Many companies turn to other adsorbent of cheaper and easy-to-get materials. Electrolysis method and oxidation method has certain effect in removing chromaticity of printing and dyeing wastewater, but COD removal is often not satisfactory, the cost of the treatment agents is relatively high. Many new means of oxidation are still in the research phase, and have not being industrialized.

In biochemical aspect, printing and dyeing products are typical fine chemical products, with characteristics of small volume and numerous varieties, and its structure is complex, production process is long, operations of nitration, condensation, reduction, oxidation, diazotization, and coupling are often accompanied from raw materials to finished products. By-products are many, production yield is low, wastewater has complex organic composition, chemical reaction of printing and dyeing production, and processes of separation, refining, and washing all use water as solvent, and thus water consumption is large. Biochemical treatment of printing and dyeing wastewater has the advantages of less investment, but there are still disadvantages that micro-organisms are difficult to adapt to printing and dyeing wastewater, water quality is volatile, and toxicity is big. And problems of sludge disposal, anaerobic biogas processing and complex management also exist. In addition, although the iron-carbon microelectrolysis electrode made some progress in the treatment of printing and dyeing wastewater, the consumption of iron-carbon produces a lot of precipitation, so that treated wastewater is difficult to use, only to meet emission standards.

The treatment of printing and dyeing wastewater using a single method is often difficult to achieve the desired results. The conventional method is to combines each treating methods, which has drawbacks of long process, high operating cost, and unstable water quality. The treated wastewater ordinarily reaches to the emission standard II. The discharged wastewater are processed with a variety of methods of biochemical, chemical, and physical and chemical treatment, so the physical and chemical properties are very stable, any following decolorizing purification becomes very difficult, and general methods are difficult to further decolor or purify the wastewater. The deeply treated wastewater reaching emission standard II will have long-term impact on the environment. On the other hand, the current fresh water resources are increasingly lacking, and water supply has become increasing problem. If deeply treated printing and dyeing wastewater can be reused as recycled water, it will not only significantly reduce the impact on the environment, but also save a lot of fresh water resources.

SUMMARY OF THE PRESENT INVENTION

An object of the present invention is to provide a purifying device for deeply treating printing and dyeing wastewater, based on a combination of nanometer catalytic microelectrolysis technology membrane technology, and conventional treating technology, has low cost, high efficiency and obtaining recycled water, with respect to existing problems of high cost, low efficiency and water waste in conventional treating methods for printing and dyeing wastewater, and a purifying process therefor.

The deeply treated printing and dyeing wastewater according to the present invention refers to printing and dyeing wastewater reaching emission standard II after pre-treatment. The printing and dyeing wastewater reaching emission standard II after pre-treatment can be printing and dyeing wastewater reaching emission standard II after treatment by at least one method of biochemical method, chemical method, physical and chemical method.

A purifying device for deeply treating printing and dyeing wastewater according to the present invention comprises:

a nanometer catalytic microelectrolysis system, for processing steps of nanometer catalytic microelectrolysis, neutralization precipitation, crude filteration and adsorption and filteration of activated carbon, comprising: a first stop valve, a first pump, a nanometer catalytic microelectrolysis tank, a neutralization tank, a sand filteration tank and an adsorption and filteration device of granular active carbon, wherein an inlet of the first stop valve is connected externally to an outlet of printing and dyeing wastewater, an inlet of the first pump is connected with an outlet of the first stop valve, an outlet of the first pump is connected with an inlet of the nanometer catalytic microelectrolysis tank and an inlet of the neutralization tank, an outlet of the nanometer catalytic microelectrolysis tank is connected with the inlet of the neutralization tank via a one-way valve, an inlet of the sand filteration tank is connected with an outlet of the neutralization tank, and an inlet of the adsorption and filteration device of granular active carbon is connected with an outlet of the sand filteration tank;

a membrane filtration and separation system, for filtering and separating the printing and dyeing wastewater purified by the nanometer catalytic microelectrolysis to obtain dialyzed liquid and concentrated liquid, comprising: a second stop valve, a second pump, a security filter, a high-pressure pump, a reverse osmosis filtration membrane system and a dialyzed liquid storage tank, wherein the membrane filtration and separation system pumps the printing and dyeing wastewater purified by the nanometer catalytic microelectrolysis into the membrane filtration and separation system with the high-pressure pump after being filtered by the security filter, the dialyzed liquid and the concentrated liquid are obtained by separating with membrane filtering, the dialyzed liquid enters into the dialyzed liquid storage tank to be recycled water, the concentrated liquid has a first part reflowing to be processed by circulated membrane filtration and separation, a second part reflowing into the step of nanometer catalytic microelectrolysis to be reused, and a rest part drained, wherein an inlet of the second stop valve is connected with the outlet of purified wastewater of the adsorption and filteration device of granular active carbon, an outlet of the second stop valve is connected with the reverse osmosis filtration membrane system via the second pump, the security filter, and the high-pressure pump in turn, and a dialyzed liquid outlet of the reverse osmosis filtration membrane system is connected with an inlet of the dialyzed liquid storage tank via a first valve; and a membrane washing regeneration system, for washing the membrane filtration and separation system, comprising a washing liquid tank and a communication pipe, wherein an inlet of the washing liquid tank is connected with an outlet of the dialyzed liquid storage tank via a third stop valve and a second valve, a first outlet of the washing liquid tank is connected with the reverse osmosis filtration membrane system via the second valve and the third stop valve, a second outlet of the washing liquid tank is connected with the security filter via the second valve, the third stop valve and the second pump, and a third outlet of the washing liquid tank is connected with the dialyzed liquid storage tank via the second valve, a first concentrated liquid outlet of the reverse osmosis filtration membrane system reflows to be connected with an inlet of the high-pressure pump via the third stop valve, a second concentrated liquid outlet of the reverse osmosis filtration membrane system reflows to be connected with the nanometer catalytic microelectrolysis tank via the third stop valve to be reused.

A purifying process for deeply treating printing and dyeing wastewater according to the present invention comprises:

after pumping the printing and dyeing wastewater with the pump, feeding a first part of the printing and dyeing wastewater into the nanometer catalytic microelectrolysis tank to be processed by catalytic microelectrolysis, and then into the neutralization tank, feeding a second part of the printing and dyeing wastewater directly into the neutralization tank to mix with the printing and dyeing wastewater purified by nanometer catalytic microelectrolysis for precipitation, filtering by the crude filter tank, and then pumping into the adsorption and filteration device of granular active carbon to be adsorbed and filtered, so as to remove chlorine and solid impurity produced by microelectrolysis, plankton, bacteria, and colloids from the printing and dyeing wastewater to obtain purified wastewater, wherein SDI thereof should be less than 5.

A working voltage of the nanometer catalytic microelectrolysis is 2~18 V, preferably 4~10 V, a current intensity is 5~5000 A, preferably 50~1000 A. The deeply treated printing and dyeing wastewater containing NaCl flows into the neutralization tank via a one-way valve after producing nascent state chlorine by microelectrolysis. The second part of the printing and dyeing wastewater directly enters into the neutralization tank via a pipe and the one-way valve. Nanometer catalytic microelectrolysis has the following advantages. (1) The nascent state chlorine produced by nanometer catalytic microelectrolysis kills microorganism in the wastewater, and reduces live bodies of microorganism to be less than 30/ml, so as to eliminate pollution of the membrane materials. (2)

Organic matters in the wastewater are oxidated and degraded, remaining dyestuff is degraded and decolored, and $COD_{Cr}$ is reduced. (3) The wastewater is purified by crude filtering and fine filtering relatively big coagulation of suspended matter and colloid in the wastewater under effect of electric field. (4) Heavy metal ions in the wastewater move towards a negative pole of the nanometer catalytic microelectrolysis tank and form precipitate thereon, so as to reduce heavy metal ions in the wastewater.

The deeply treated wastewater still has deep color and higher $COD_{Cr}$ after being treated by multiple processing of biochemical, chemical, physical and chemical methods, and ordinary chemical treatment is very difficult to further decolorize and decrease $COD_{Cr}$. In the natural environment, even after several days, the wastewater will not fade. Treating the deeply treated wastewater with nanometer catalytic microelectrolysis can decolor the wastewater and significantly reduce $COD_{Cr}$ within 2 to 5 minutes.

A concentration of NaCl of the printing and dyeing wastewater is 6°/00~50°/00, preferably 0.6°/00~1.3°/00, and can be increased to 6°/00~50°/00 with industrial NaCl when low.

The step of nanometer catalytic microelectrolysis produces nascent state chlorine by nanometer catalytic microelectrolysis of ⅓ to ⅕ of the deeply treated printing and dyeing wastewater, so as to oxidate and degrade organic matters in the wastewater kill microorganism in the wastewater, and produce coagulation of suspended matter, colloid, and charged corpuscle in the wastewater to form relatively larger particles under effect of electric field.

The step of neutralization precipitation mixes the wastewater treated with nanometer catalytic microelectrolysis, which contains nascent state chlorine, with the rest ⅔ to ⅘ of the deeply treated printing and dyeing wastewater not treated with nanometer catalytic microelectrolysis, the nascent state chlorine produced by nanometer catalytic microelectrolysis oxidates and degrades organic matters in the wastewater and kills the microorganism in the wastewater. Crystal nucleus produced by coagulation of microelectrolysis precipitates the suspended matter, solid particles, and colloid.

The crude filtration is one selected from the group consisting of sand filteration, and multi-media filteration.

The membrane filtration and separation system is one selected from the group consisting of a reverse osmosis membrane filtration and separation system, and a nanofiltration membrane filtration and separation system.

A reverse osmosis membrane of the reverse osmosis membrane filtration system, is a reverse osmosis membrane having NaCl retention rate of 98%, a membrane structure is rolling membrane module or a tubular membrane module, a working condition is from room temperature to 45° C., and a working pressure is 7~25 bar.

A nanofiltration membrane of the nanofiltration membrane filtration and separation system, is a nanofiltration membrane having $MgSO_4$ retention rate of 98%, a membrane structure is rolling membrane module or a tubular membrane module, a working condition is from room temperature to 45° C., and a working pressure is 3~20 bar.

The present invention not only overcomes the defects of high cost by single-use of the membrane filtration and separation process, or adsorption process, but also overcomes the defects of unsatisfying treating effect of conventional methods of treating printing and dyeing wastewater and polluting the environment by the drained wastewater, turning the decayed into wonder, and using the waste as a resource by purifying existing deeply treated printing and dyeing wastewater and recycling to reuse. Compared with prior art, The present invention has the following outstanding advantages of:

1. fast degrading remaining dyestuff of the deeply treated printing and dyeing wastewater to eliminate the color thereof within 2 to 5 minutes;
2. low investment;
3. deep treating degree, so that pollution is greatly reduced;
4. low cost, and large economic efficiency;
5. high utilization of water resources; and
6. greatly reducing discharge of wastewater.

DETAILED DESCRIPTION OF THE PREFERRED EMBODIMENT

Figure 1:
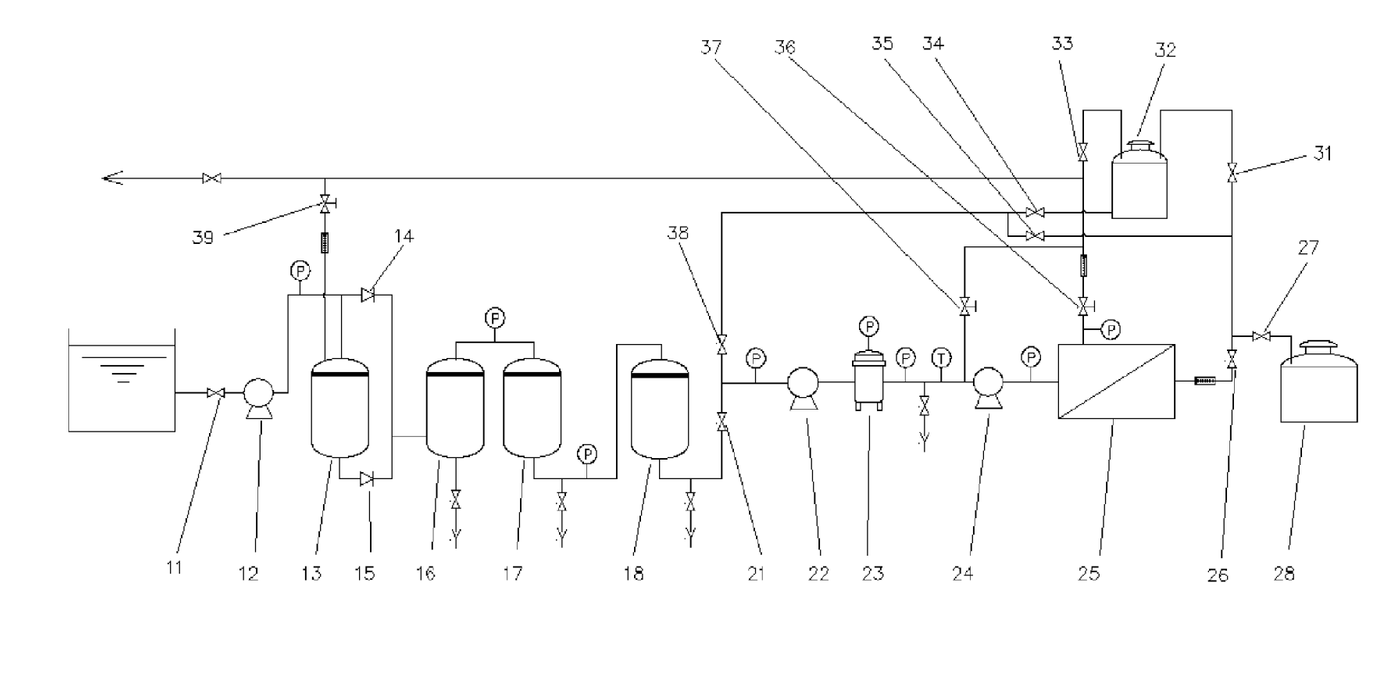
The FIGURE is a sketch view of a structure of a purifying device for deeply treating printing and dyeing wastewater according to a preferred embodiment of the present invention.

The present invention finishes a designing of a process for purifying deeply treating printing and dyeing wastewater and reusing recycled water after deep and systematic comparative study of composition and property of the existing deeply treating printing and dyeing wastewater, and conventional treating processes. The present invention provides a process especially adapted for purifying deeply treating printing and dyeing wastewater and reusing recycled water by combining methods of nanometer catalytic microelectrolysis, neutralization, crude filteration, adsorption and filteration of activated carbon, and membrane filtration.

A preferred embodiment of the present invention describing detailedly is as follows accompanying with the FIGURE.

Referring to the FIGURE, a purifying device for deeply treating printing and dyeing wastewater according to a preferred embodiment of the present invention, comprising:

a nanometer catalytic microelectrolysis system, for processing steps of nanometer catalytic microelectrolysis, neutralization precipitation, crude filteration and adsorption and filteration of activated carbon, comprising: a first stop valve 11, a first pump 12, a nanometer catalytic microelectrolysis tank 13, a neutralization tank 16, a sand filteration tank 17 and an adsorption and filteration device of granular active carbon 18, wherein an inlet of the first stop valve 11 is connected externally to an outlet of printing and dyeing wastewater, an inlet of the first pump 12 is connected with an outlet of the first stop valve 11, an outlet of the first pump 12 is connected with an inlet of the nanometer catalytic microelectrolysis tank 13 and an inlet of the neutralization tank 16, an outlet of the nanometer catalytic microelectrolysis tank 13 is connected with the inlet of the neutralization tank 16 via a one-way valve, an inlet of the sand filteration tank 17 is connected with an outlet of the neutralization tank 16, and an inlet of the adsorption and filteration device of granular active carbon 18 is connected with an outlet of the sand filteration tank 17;

a membrane filtration and separation system, for filtering and separating the printing and dyeing wastewater purified by the nanometer catalytic microelectrolysis to obtain dialyzed liquid and concentrated liquid, comprising: a second stop valve 21, a second pump 22, a security filter 23, a high-pressure pump 24, a reverse osmosis filtration membrane system 25, a first valve 26, a second valve 27, and a dialyzed liquid storage tank 28, wherein the membrane filtration and separation system pumps the printing and dyeing wastewater purified by the nanometer catalytic microelectrolysis into the membrane filtration and separation system with the high-pressure pump 24 after being filtered by the security filter 23, the dialyzed liquid and concentrated liquid are obtained by separating with membrane filtering, the dialyzed liquid enters into the dialyzed liquid storage tank 28 to be recycled water, the concentrated liquid has a first part reflowing to be processed by circulated membrane filtration and separation, a second part reflowing into the step of nanometer catalytic microelectrolysis to be reused, and a rest part drained, wherein an inlet of the second stop valve 21 is connected with the outlet of purified wastewater of the adsorption and filteration device of granular active carbon 18, an outlet of the second stop valve 21 is connected with the reverse osmosis filtration membrane system 25 via the second pump 22, the security filter 23, and the high-pressure pump 24 in turn, and a dialyzed liquid outlet of the reverse osmosis filtration membrane system 25 is connected with an inlet of the dialyzed liquid storage tank 28 via the first valve 26 and the second valve 27; and a membrane washing regeneration system, for washing the membrane filtration and separation system, comprising: a third stop valve 31, a washing liquid tank 32, a third valve 33, a fourth valve 34, a fifth valve 35, a fourth stop valve 36, a fifth stop valve 37, a sixth stop valve 38, a seventh stop valve 39, and a communication pipe, wherein an inlet of the washing liquid tank 32 is connected with an outlet of the dialyzed liquid storage tank 28 via a third stop valve 31 and a second valve 27, a first outlet of the washing liquid tank 28 is connected with the reverse osmosis filtration membrane system 25 via the third valve 33 and the fourth stop valve 36, a second outlet of the washing liquid tank 32 is connected with the security filter 25 via the fourth valve 34, the sixth stop valve 38 and the second pump 22, and a third outlet of the washing liquid tank 32 is connected with the dialyzed liquid storage tank 28 via the fifth valve 35 and the second valve 27, a first concentrated liquid outlet of the reverse osmosis filtration membrane system 25 reflows to be connected with an inlet of the high-pressure pump 24 via the fourth stop valve 36 and the fifth stop valve 37, a second concentrated liquid outlet of the reverse osmosis filtration membrane system 25 reflows to be connected with the nanometer catalytic microelectrolysis tank 13 via the seventh stop valve 39 to be reused.

A purifying process for printing and dyeing wastewater of a purifying device for deeply treating printing and dyeing wastewater according to a preferred embodiment of the present invention in the FIGURE is shown as follows.

EXAMPLE 1

A process for purifying deeply treating printing and dyeing wastewater of 150 tons per day and reusing recycled water.

The deeply treating printing and dyeing wastewater has measured indexes shown in Table 1.

TABLE 1

| No. | Item | Unit | Measured value |
|---|---|---|---|
| 1 | $COD_{Cr}$ | mg/L | 156 |
| 2 | SS | mg/L | 110 |
| 3 | turbidity | NTU | 6 |
| 4 | chromaticity |  | 80 |
| 5 | saltness | ‰ | 6.6 |
| 6 | pH |  | 8.3 |
| 7 | conductivity | μS/cm | 7200 |

The deeply treating printing and dyeing wastewater of 150 tons per day is drawn via the first pump 12 for 7.5T/H. At the beginning, a first part thereof flows into the nanometer catalytic microelectrolysis tank 13 via a T-cock for 1.5T/H, when the system runs stably and the concentrated liquid flows to recycle, a flow speed through the nanometer catalytic microelectrolysis tank 13 is adjusted to be 2.8T/H, after catalytic microelectrolysis, flows into the neutralization tank 16 via a first one-way valve 15, and a second part flows directly into the neutralization tank 16 to mix with the printing and dyeing wastewater purified by nanometer catalytic microelectrolysis for precipitation for 6.0T/H via the T-cock and a second one-way valve 14, is filtered by a crude filter tank 17, and pumped into the adsorption and filteration device of granular active carbon 18 to be adsorbed and filtered, so as to remove solid impurity, plankton, bacteria, and colloids from the printing and dyeing wastewater to obtain purified wastewater.

A working voltage of the nanometer catalytic microelectrolysis is 8~9V, a current intensity is 500~510 A. The nascent state chlorine produced by nanometer catalytic microelectrolysis oxidates and degrades organic matters in the wastewater, and forms relatively big coagulation of suspended matter, colloid and charged particles in the wastewater under effect of electric field to be removed by crude filtering and fine filtering for purifying the wastewater. A measured SDI is 2.5.

The purified wastewater, which is purified by nanometer catalytic microelectrolysis, is pumped into the reverse osmosis filtration membrane system 25 via the second stop valve 21 and the high-pressure pump 24, the dialyzed liquid is stored in the dialyzed liquid storage tank 28 via the first valve 26, the T-cock, and the second valve 27, and supplies water to a clean water storage tank 32 via the T-cock and the third stop valve 31.

A reverse osmosis membrane of the reverse osmosis membrane filtration system 25, is a reverse osmosis rolling membrane having NaCl retention rate of 98%, a working condition is 32~35° C., a working pressure is 9·12 bar, a membrane flux is 20 ml/cm², flowing speeds of the dialyzed liquid and the concentrated liquid are respectively 5.3T/H and 4.9T/H, the concentrated liquid reflows to be reused via the fourth stop valve 36 and the fifth stop valve 37 for 1.4 T/H, reflows into the nanometer catalytic microelectrolysis tank 13 via the seventh stop valve 39 to be reused for 1.3 T/H, and drains the rest for 2.6 T/H. The recycled rate of the wastewater is 65%, qualities of the recycled water are shown in Table 2, and indexes of the concentrated liquid is shown in Table 3.

TABLE 2

| No. | Item | Unit | Measured value |
|---|---|---|---|
| 1 | $COD_{Cr}$ | mg/L | 9 |
| 2 | SS | mg/L | 15 |
| 3 | turbidity | NTU | 0.8 |
| 4 | chromaticity |  | 15 |
| 5 | pH |  | 6.7 |
| 6 | conductivity | μS/cm | 10 |

TABLE 3

| No. | Item | Unit | Measured value |
|---|---|---|---|
| 1 | $COD_{Cr}$ | mg/L | 156 |
| 2 | SS | mg/L | 50 |
| 3 | turbidity | NTU | 2 |
| 4 | chromaticity |  | 30 |
| 5 | saltness | ‰ | 3.7 |

TABLE 3-continued

| No. | Item | Unit | Measured value |
|---|---|---|---|
| 6 | pH | | 8.5 |
| 7 | conductivity | μS/cm | 9100 |

EXAMPLE 2

A process for purifying deeply treating printing and dyeing wastewater of 3,000 tons per day and reusing recycled water.

The deeply treating printing and dyeing wastewater has measured indexes shown in Table 4.

TABLE 4

| No. | Item | Unit | Measured value |
|---|---|---|---|
| 1 | $COD_{Cr}$ | mg/L | 181 |
| 2 | SS | mg/L | 160 |
| 3 | turbidity | NTU | 7.5 |
| 4 | chromaticity | | 13 |
| 5 | pH | | 7.6 |
| 6 | conductivity | μS/cm | 6000 |

The deeply treating printing and dyeing wastewater is drawn via the first pump 12 for 150 T/H. A first part thereof flows into the nanometer catalytic microelectrolysis tank 13 via a T-cock for 50 T/H, when the system runs stably and the concentrated liquid flows to recycle, a flow speed through the nanometer catalytic microelectrolysis tank 13 is adjusted to be 75 T/H, wherein the deeply treating printing and dyeing wastewater is 50 T/H, the concentrated liquid after reflowing for catalytic microelectrolysis for 25 T/H, flows into the neutralization tank 16 via a first one-way valve 15, and a second part flows directly into the neutralization tank 16 to mix with the printing and dyeing wastewater purified by nanometer catalytic microelectrolysis for precipitation for 100 T/H via the T-cock, a pipe and a second one-way valve 14, is filtered by a crude filter tank 17, and pumped into the adsorption and filtration device of granular active carbon 18 to be adsorbed and filtered, so as to remove solid impurity, plankton, bacteria, and colloids from the printing and dyeing wastewater to obtain purified wastewater.

Due to low saltness of the deeply treating printing and dyeing wastewater, industrial NaCl is added to increase the saltness up to 12.5%, and then nanometer catalytic microelectrolysis is processed. A working voltage of the nanometer catalytic microelectrolysis is 5~6 V, a current intensity is 1560~1580 A. The nascent state chlorine produced by nanometer catalytic microelectrolysis oxidates and degrades organic matters in the wastewater, and forms relatively big coagulation of suspended matter, colloid and charged particles in the wastewater under effect of electric field to be removed by crude filtering and fine filtering for purifying the wastewater. A measured SDI is 2.9.

The purified wastewater, which is purified by nanometer catalytic microelectrolysis, is pumped into the reverse osmosis filtration membrane system 25 via the second stop valve 21 and the high-pressure pump 24 to obtain the dialyzed liquid and the concentrated liquid, flowing speeds of the dialyzed liquid and the concentrated liquid are respectively 73.5 T/H and 127.5T/H, the dialyzed liquid is stored in the dialyzed liquid storage tank 28 via the first valve 26, the T-cock, and the second valve 27 for 127.5T/H, and supplies water to a clean water storage tank 32 via the T-cock and the third stop valve 31. The concentrated liquid reflows to be reused via the fourth stop valve 36 and the fifth stop valve 37 for 26 T/H, reflows into the nanometer catalytic microelectrolysis tank 13 via the seventh stop valve 39 to be reused for 25.0 T/H, and drains the rest for 22.5 T/H. The recycled rate of the wastewater is 85%, qualities of the recycled water are shown in Table 5, and indexes of the concentrated liquid are shown in Table 6.

A nanofiltration membrane of the nanofiltration membrane filtration and separation system, is a nanofiltration rolling membrane having $MgSO_4$ retention rate of 98%, a working condition is 20~25° C., a working pressure is 6.5~8.0 bar, and a membrane flux is 26 ml/cm².

TABLE 5

| No. | Item | Unit | Measured value |
|---|---|---|---|
| 1 | $COD_{Cr}$ | mg/L | 10 |
| 2 | SS | mg/L | 18 |
| 3 | turbidity | NTU | 1 |
| 4 | chromaticity | | 18 |
| 5 | pH | | 7.7 |
| 6 | Hardness | mmol/l | |

TABLE 6

| No. | Item | Unit | Measured value |
|---|---|---|---|
| 1 | $COD_{Cr}$ | mg/L | 75 |
| 2 | SS | mg/L | 50 |
| 3 | turbidity | NTU | 2.6 |
| 4 | saltness | ‰ | 11.5 |
| 5 | pH | | 8.2 |
| 6 | conductivity | μS/cm | 11200 |

EXAMPLE 3

A process for purifying deeply treating printing and dyeing wastewater of 6,000 tons per day and reusing recycled water.

The deeply treating printing and dyeing wastewater has measured indexes shown in Table 7.

TABLE 7

| No. | Item | Unit | Measured value |
|---|---|---|---|
| 1 | $COD_{Cr}$ | mg/L | 391 |
| 2 | SS | mg/L | 190 |
| 3 | turbidity | NTU | 8.4 |
| 4 | saltness | | 0.9 |
| 5 | pH | | 7.7 |
| 6 | conductivity | μS/cm | 8100 |

The deeply treating printing and dyeing wastewater is drawn via the first pump 12 for 300 T/H. A first part thereof flows into the nanometer catalytic microelectrolysis tank 13 via a T-cock for 100 T/H, when the system runs stably and the concentrated liquid flows to recycle, a flow speed through the nanometer catalytic microelectrolysis tank 13 is adjusted to be 75 T/H, wherein the deeply treating printing and dyeing wastewater is 100 T/H, the concentrated liquid after reflowing for catalytic microelectrolysis for 25 T/H, flows into the neutralization tank 16 via a first one-way valve 15, and a second part flows directly into the neutralization tank 16 to mix with the printing and dyeing wastewater purified by nanometer catalytic microelectrolysis for precipitation for 200 T/H via the T-cock, a pipe and a second one-way valve 14, is filtered by a crude filter tank 17, and pumped into the adsorption and filteration device of granular active carbon 18 to be adsorbed and filtered, so as to remove solid impurity, plankton, bacteria, and colloids from the printing and dyeing wastewater to obtain purified wastewater.

The deeply treating printing and dyeing wastewater has low saltness. A working voltage of the nanometer catalytic microelectrolysis is 16~18 V, a current intensity is 3760~3800A. A first part of the deeply treating printing and dyeing wastewater after catalytic microelectrolysis to produce nascent state chlorine flows into the neutralization tank 16 via a first one-way valve 15 for 100 T/H, and a second part flows directly into the neutralization tank 16 to mix with the printing and dyeing wastewater purified by nanometer catalytic microelectrolysis for precipitation for 200 T/H via a pipe and a second one-way valve 14. The nascent state chlorine produced by nanometer catalytic microelectrolysis oxidates and degrades organic matters in the wastewater, and forms relatively big coagulation of suspended matter, colloid and charged particles in the wastewater under effect of electric field to be removed by crude filtering and fine filtering for purifying the wastewater. A measured SDI is 4.5.

The purified wastewater, which is purified by nanometer catalytic microelectrolysis, is pumped into the reverse osmosis filtration membrane system 25 via the second stop valve 21 and the high-pressure pump 24 to obtain the dialyzed liquid and the concentrated liquid, the dialyzed liquid is stored in the dialyzed liquid storage tank 28 via the first valve 26, the T-cock, and the second valve 27 for 195 T/H, and supplies water to a clean water storage tank 32 via the T-cock and the third stop valve 31. The concentrated liquid has a first part reflowing to be reused via the fourth stop valve 36 and the fifth stop valve 37 for 90 T/H, a second part reflowing into the nanometer catalytic microelectrolysis tank 13 via the seventh stop valve 39 to be reused for 100 T/H, and a third part drained for 105 T/H.

A reverse osmosis membrane of the reverse osmosis membrane filtration system 25, is a reverse osmosis rolling membrane having NaCl retention rate of 98%, a working condition is 18~21° C., a working pressure is 15~17 bar, and a membrane flux is 20 ml/cm$^2$. The recycled rate of the wastewater is 65%, qualities of the recycled water are shown in Table 8, and indexes of the concentrated liquid are shown in Table 9.

TABLE 8

| No. | Item | Unit | Measured value |
|---|---|---|---|
| 1 | COD$_{Cr}$ | mg/L | 9 |
| 2 | SS | mg/L | 15 |
| 3 | turbidity | NTU | 0.7 |
| 4 | chromaticity | | 13 |
| 5 | pH | | 6.9 |
| 6 | conductivity | µS/cm | 8 |

TABLE 9

| No. | Item | Unit | Measured value |
|---|---|---|---|
| 1 | COD$_{Cr}$ | mg/L | 83 |
| 2 | SS | mg/L | 55 |
| 3 | turbidity | NTU | 3 |
| 4 | chromaticity | | 30 |
| 5 | saltness | ‰ | 2.7 |
| 6 | pH | | 8.5 |
| 7 | conductivity | µS/cm | 6500 |

EXAMPLE 4

A process for purifying deeply treating printing and dyeing wastewater of 20,000 tons per day and reusing recycled water.

The deeply treating printing and dyeing wastewater has measured indexes shown in Table 10.

The deeply treating printing and dyeing wastewater is drawn via the first pump 12 for 1000 T/H. A first part thereof flows into the nanometer catalytic microelectrolysis tank 13 via a T-cock for 250 T/H, when the system runs stably and the concentrated liquid flows to recycle, a flow speed through the nanometer catalytic microelectrolysis tank 13 is adjusted to be 360 T/H, wherein the deeply treating printing and dyeing wastewater is 250 T/H, the concentrated liquid after reflowing for catalytic microelectrolysis for 110 T/H, flows into the neutralization tank 16 via a first one-way valve 15, and a second part flows directly into the neutralization tank 16 to mix with the printing and dyeing wastewater purified by nanometer catalytic microelectrolysis for precipitation for 750 T/H via the T-cock, a pipe and a second one-way valve 14, is filtered by a crude filter tank 17, and pumped into the adsorption and filteration device of granular active carbon 18 to be adsorbed and filtered, so as to remove solid impurity, plankton, bacteria, and colloids from the printing and dyeing wastewater to obtain purified wastewater.

TABLE 10

| No. | Item | Unit | Measured value |
|---|---|---|---|
| 1 | COD$_{Cr}$ | mg/L | 155 |
| 2 | SS | mg/L | 182 |
| 3 | turbidity | NTU | 6.5 |
| 4 | chromaticity | | 1.5 |
| 5 | pH | | 7.7 |
| 6 | conductivity | µS/cm | 6900 |

Due to low saltness of the deeply treating printing and dyeing wastewater, industrial NaCl is added to increase the saltness up to 9.5°/00, and then nanometer catalytic microelectrolysis is processed. A working voltage of the nanometer catalytic microelectrolysis is 6~7 V, a current intensity is 4950~5000 A. The nascent state chlorine produced by nanometer catalytic microelectrolysis oxidates and degrades organic matters in the wastewater, and forms relatively big coagulation of suspended matter, colloid and charged particles in the wastewater under effect of electric field to be removed by crude filtering and fine filtering for purifying the wastewater. A measured SDI is 2.6.

The purified wastewater, which is purified by nanometer catalytic microelectrolysis, is pumped into the reverse osmosis filtration membrane system 25 via the second stop valve 21 and the high-pressure pump 24 to obtain the dialyzed liquid and the concentrated liquid, flowing speeds of the dialyzed liquid and the concentrated liquid are respectively 400.00 T/H and 860.00 T/H. The concentrated liquid reflows to be reused via the fourth stop valve 36 and the fifth stop valve 37 for 150.00 T/H, reflows into the nanometer catalytic microelectrolysis tank 13 via the seventh stop valve 39 to be reused for 110.00 T/H, and drains the rest for 140.00 T/H. The recycled rate of the wastewater is 86%, qualities of the recycled water are shown in Table 11, and indexes of the concentrated liquid are shown in Table 12.

TABLE 11

| No. | Item | Unit | Measured value |
|---|---|---|---|
| 1 | $COD_{Cr}$ | mg/L | 9 |
| 2 | SS | mg/L | 20 |
| 3 | turbidity | NTU | 0.9 |
| 4 | chromaticity | | 13 |
| 5 | pH | | 7.4 |
| 6 | Hardness | mmol/l | |

TABLE 12

| No. | Item | Unit | Measured value |
|---|---|---|---|
| 1 | $COD_{Cr}$ | mg/L | 95 |
| 2 | SS | mg/L | 39 |
| 3 | turbidity | NTU | 1.9 |
| 4 | saltness | ‰ | 11.5 |
| 5 | pH | | 8.2 |
| 6 | conductivity | μS/cm | 9200 |

A nanofiltration membrane of the nanofiltration membrane filtration and separation system, is a nanofiltration rolling membrane having $MgSO_4$ retention rate of 98%, a working condition is 20∞45° C., a working pressure is 6.5~15.0 bar, and a membrane flux is 29 ml/cm².

What is claimed is:

1. A purifying device for deeply treating printing and dyeing wastewater, comprising:
    a catalytic microelectrolysis system, for processing steps of catalytic microelectrolysis, neutralization precipitation, crude filtration and adsorption and filteration of activated carbon, comprising: a first stop valve, a first pump, a catalytic microelectrolysis tank, a neutralization tank, a sand filteration tank and an adsorption and filteration device of granular active carbon, wherein an inlet of said first stop valve is connected externally to an outlet for draining printing and dyeing wastewater, an inlet of said first pump is connected with an outlet of said first stop valve, an outlet of said first pump is connected with an inlet of said catalytic microelectrolysis tank and an inlet of said neutralization tank, an outlet of said catalytic microelectrolysis tank is connected with said inlet of said neutralization tank via a one-way valve, an inlet of said sand filteration tank is connected with an outlet of said neutralization tank, and an inlet of said adsorption and filteration device of granular active carbon is connected with an outlet of said sand filteration tank;
    a membrane filtration and separation system, for filtering and separating the printing and dyeing wastewater purified by said catalytic microelectrolysis to obtain dialyzed liquid and concentrated liquid, comprising: a second stop valve, a second pump, a security filter, a high-pressure pump, a reverse osmosis filtration membrane system and a dialyzed liquid storage tank, wherein said membrane filtration and separation system pumps the printing and dyeing wastewater purified by said catalytic microelectrolysis into said membrane filtration and separation system with said high-pressure pump after being filtered by said security filter, the dialyzed liquid and the concentrated liquid are obtained by separating with membrane filtering, the dialyzed liquid enters into said dialyzed liquid storage tank to be recycled water, the concentrated liquid has a first part reflowing to be processed by circulated membrane filtration and separation, a second part reflowing into said step of catalytic microelectrolysis to be recycled, and a rest part drained, wherein an inlet of said second stop valve is connected with said outlet of purified wastewater of said adsorption and filteration device of granular active carbon, an outlet of said second stop valve is connected with said reverse osmosis filtration membrane system via said second pump, said security filter, and said high-pressure pump in turn, and a dialyzed liquid outlet of said reverse osmosis filtration membrane system is connected with an inlet of said dialyzed liquid storage tank via a first valve; and
    a membrane washing regeneration system, for washing said membrane filtration and separation system, comprising a washing liquid tank and a communication pipe, wherein an inlet of said washing liquid tank is connected with an outlet of said dialyzed liquid storage tank via a third stop valve and a second valve, a first outlet of said washing liquid tank is connected with said reverse osmosis filtration membrane system via said second valve and said third stop valve, a second outlet of said washing liquid tank is connected with said security filter via said second valve, said third stop valve and said second pump, and a third outlet of said washing liquid tank is connected with said dialyzed liquid storage tank via said second valve, a first concentrated liquid outlet of said reverse osmosis filtration membrane system reflows to be connected with an inlet of said high-pressure pump via said third stop valve, a second concentrated liquid outlet of said reverse osmosis filtration membrane system reflows to be connected with said catalytic microelectrolysis tank via said third stop valve to be recycled.

2. A purifying process for treating printing and dyeing wastewater, with the purifying device for deeply treating printing and dyeing wastewater as recited in claim 1, comprising:
    after pumping the printing and dyeing wastewater with the pump, feeding a first part of the printing and dyeing wastewater into the catalytic microelectrolysis tank to be processed by catalytic microelectrolysis, and then into the neutralization tank, feeding a second part of the printing and dyeing wastewater directly into the neutralization tank to mix with the printing and dyeing wastewater purified by catalytic microelectrolysis for precipitation, filtering by the crude filter tank, and then pumping into the adsorption and filteration device of granular active carbon to be adsorbed and filtered, so as to remove chlorine and solid impurity produced by microelectrolysis, plankton, bacteria, and colloids from the printing and dyeing wastewater to obtain purified wastewater, wherein SDI thereof should be less than 5.

3. The purifying process, as recited in claim 2, wherein a working voltage of the catalytic microelectrolysis is 2~18 V, and a current intensity is 5~5000 A.

4. The purifying process, as recited in claim 2, wherein a working voltage of the catalytic microelectrolysis is 4~12V, and a current intensity is 5~1000 A.

5. The purifying process, as recited in claim 2, wherein a concentration of NaCl of the printing and dyeing wastewater is 6‰~5.0‰.

6. The purifying process, as recited in claim 2, wherein a concentration of NaCl of the printing and dyeing wastewater is 0.6‰~1.3‰.

7. The purifying process, as recited in claim 2, wherein the crude filteration is one selected from the group consisting of sand filteration, and multi-media filteration.

8. The purifying process, as recited in claim 2, wherein the membrane filtration and separation system is one selected from the group consisting of a reverse osmosis membrane filtration and separation system, and a nanofiltration membrane filtration and separation system.

9. The purifying process, as recited in claim 2, wherein a reverse osmosis membrane of the reverse osmosis membrane filtration system is a reverse osmosis membrane having NaCl retention rate of 98%, a membrane structure is rolling membrane module or a tubular membrane module, a working condition is from room temperature to 45° C., and a working pressure is 7~25 bar.

10. The purifying process, as recited in claim 2, wherein a nanofiltration membrane of the nanofiltration membrane filtration and separation system, is a nanofiltration membrane having $MgSO_4$ retention rate of 98%, a membrane structure is rolling membrane module or a tubular membrane module, a working condition is from room temperature to 45° C., and a working pressure is 3~20 bar.

\* \* \* \* \*